United States Patent Office 3,340,244
Patented Sept. 5, 1967

3,340,244
ORGANO ALUMINUM HALIDE CATALYSTS AND POLYMERIZATION PROCESSES EMPLOYING SAME
Harry W. Coover, Jr., and Marvin A. McCall, Kingsport, Tenn., assignors to Eastman Kodak Company, Rochester, N.Y., a corporation of New Jersey
No Drawing. Filed Sept. 21, 1964, Ser. No. 398,051
13 Claims. (Cl. 260—93.7)

This invention relates to the polymerization of hydrocarbons and catalysts useful for this purpose. More particularly, this invention relates to the catalytic polymerization of α-olefinic hydrocarbons containing at least three carbon atoms to form solid, crystalline polymers using a catalyst combination which has unexpected activity.

It is well known that in the catalytic polymerization of olefinic hydrocarbons such as ethylene or propylene, it is possible to produce polymers having widely different properties and physical characteristics, depending to a large extent, upon the catalyst system employed. For example, catalytic mixtures of ethyl aluminum sesquichloride in conjunction with titanium trichloride can be used to polymerize ethylene to solid, crystalline polymer. However, when catalytic mixtures of ethyl aluminum sesquichloride and titanium trichloride are employed to polymerize propylene, the product is predominately polymeric oil and rubber. Similarly, little or no solid polymer is formed when propylene is polymerized with catalyst mixtures of diethyl aluminum chloride and titanium trichloride.

An object of this invention is to provide an improved process for the polymerization of α-olefinic hydrocarbons to form solid, highly crystalline products.

It is another object of this invention to provide an improved process for the polymerization of propylene and higher α-monoolefinic hydrocarbons to produce solid, high molecular weight, crystalline products.

It is another object of this invention to provide catalyst combinations which have unexpected catalytic activity for the polymerization of olefinic hydrocarbons to form crystalline, high molecular weight polymers.

Other objects of this invention will be readily apparent from the detailed disclosure and claims that follow.

In accordance with this invention, it has been found that α-olefinic hydrocarbons containing at least three carbon atoms can be polymerized in the presence of a catalyst composition comprising (1) organo-aluminum halides having the formula: $R_mAlX_n$ or $R_3Al_2X_3$ where R is a member selected from the group consisting of alkyl, cycloalkyl, phenyl, tolyl, X is a halogen selected from the group consisting of chlorine and bromine and $m$ and $n$ are integers whose sum is equal to the valence of aluminum, (2) a compound selected from the group consisting of halides and lower alkoxides of a transition metal from Group IV-B—VI-B of the Periodic Table and (3) a member selected from the group consisting of (a) monocyclic hydrocarbons containing up to 16 carbon atoms and at least three ethylenic bonds in the ring, (b) phenyl substituted acyclic straight chain hydrocarbons containing at least three ethylenic bonds in the chain and (c) polybutadienes having molecular weights in the range of about 500 to about 5,000.

This novel process is extremely effective for polymerizing α-olefinic hydrocarbons containing at least three carbon atoms and particularly the straight and branched chain aliphatic or aromatic α-monoolefinic hydrocarbons containing 3–10 carbon atoms to form solid high molecular weight, crystalline polymers in excellent yield. The polymerizable olefinic hydrocarbons suitable for use in the practice of this invention include propylene, butene-1, pentene-1, octene-1, decene-1, 3-methyl-1-butene, 4-methyl-1-pentene, 4-methyl-1-hexene, 5-methyl-1-hexene, 4,4-dimethyl-1-pentene, styrene, α-methylstyrene, allylcyclohexene, allylcyclopentene, allylbenzene, isoprene, 1, 3-butadiene and similar α-olefinic hydrocarbons containing at least three carbon atoms. In practicing the invention, such α-olefinic hydrocarbons can be polymerized alone, in admixture or sequentially with each other or with other polymerizable hydrocarbons.

A significant feature of this invention is that a relatively slight change in the catalytic mixtures of this invention will make them ineffective as catalysts in the polymerization process. As shown by the following examples, two components of the catalyst, without the third, are ineffective to form high molecular weight, crystalline polymers. Likewise, ethylenically unsaturated hydrocarbons which contain at least three double bonds but which are different from those specified above, form ineffective catalyst components.

As already indicated, one component of the catalyst is a transition metal compound comprising the alkoxides, particularly the lower alkoxides, alkoxy halides and halides such as iodide, chloride, or bromide of a transition metal from Group IVB–VIB of the Periodic Table. The Periodic Table referred to herein can be found in Lange's Handbook of Chemistry, 8th Edition, 1952, published by Handbook Publishers, Inc. at pages 56 and 57.

The transition metals included in Groups IVB, VB and VIB of the Periodic Table are exemplified by titanium, zirconium, vanadium, molybdenum, chromium and the like. The transition metal compounds can be used at their maximum valence or if desired, a reduced valency form of the compound can be employed. It is preferred that the transition metal polyhalides in which the valence of the metal is at least one less than maximum be employed. The titanium halides, particularly titanium tribromide and titanium trichloride, give good results in the practice of this invention. Such halides can be prepared by any suitable method known to be useful for this purpose. Thus, titanium trichloride, for example, can be prepared by reducing titanium tetrachloride with hydrogen, alkali metals or other metals such as aluminum, titanium, antimony and the like. Examples of metal alkoxides, alkoxy halides and alkoxides that can be employed are titanium tetrabromide, zirconium tetrachloride, molybdenum pentachloride, titanium tetrabutoxide, titanium tetraoctoxide, vanadium trichloride, vanadium dichloride, molybdenum dichloride, tungsten dibromide, zirconium trichloride, chromium dichloride, vanadium triethoxide, dichloro titanium dibutoxide, and the like.

The catalytic mixtures employed in practicing this invention also contain an ethylenically unsaturated hydrocarbon which contains at least three double bonds in the ring as the sole unsaturation. These cycloaliphatic hydrocarbon are monocyclic and generally contain up to about 16 carbon atoms, preferably about 8 to 12 carbon atoms, and about 3 to about 5 ethylenic bonds in the ring. Such compounds can be obtained by the catalytic polymerization of butadiene to form cyclic compounds which are often called "oligomers." Other ethylenically unsaturated hydrocarbons which are employed with good results are the phenyl substituted acyclic straight chain hydrocarbons containing at least three double bonds as the sole unsaturation in the chain and up to about 20 carbon atoms. The preferred straight chain acyclic hydrocarbons contain 3–8, most desirably 3–6, ethylenic double bonds and about 4 to about 20 carbon atoms, although those containing 6–16 carbon atoms give very good results. Still another type of ethylenically unsaturated hydrocarbon employed as one component of the catalyst is a high molecular weight linear polymer of butadiene.

The polybutadiene employed generally has an inherent viscosity in tetralin at 145° C. (0.25% concentration) in the range of about .1 to about 1.5, preferably about 0.1 to .25. These additional catalyst components are exemplified by such compounds as 1,5,9-cyclododecatriene, cyclooctatetraene, cycloheptatriene, 1,2- and 1,4-polybutadienes which are generally soluble in such solvents as benzene, the cumulenes such as tetraphenyl-1,2,3-butatriene and tetraphenyl-1,2,3,4,5-hexapentaene, 1,6-diphenyl-1,3,5-hexatriene, 1,8-diphenyl octatetraene and 1,16-diphenyl hexadecaoctaene and the like.

In addition to the transition metal compounds and the ethylenically unsaturated hydrocarbons the catalyst composition of this invention contains another component which is an organo-aluminum halide. The organo-aluminum halides employed have the formula $R_mAlX_n$ or $R_2Al_2X_3$ where R is alkyl, cycloalkyl, phenyl, tolyl, X is a halogen such as chlorine or bromine and $m$ and $n$ are integers whose sum is equal to the valence of aluminum. Such compounds are exemplified by ethyl aluminum dichloride, cyclohexyl aluminum dichloride, cyclobutyl aluminum dibromide, ethyl aluminum dibromide, ethyl aluminum dichloride, diethyl aluminum bromide, dimethyl aluminum bromide, propyl aluminum dichloride, dibutyl aluminum chloride, diethyl aluminum chloride and the like.

The inventive process is generally carried out in a liquid phase in an inert organic liquid and preferably in an inert liquid hydrocarbon vehicle, but the process can be carried out in the absence of an inert diluent. For example, liquid monomer can be used as the reaction vehicle. The process proceeds with excellent results over a temperature range of from about 50° to about 250° C., although it is preferred to operate in the range of from about 50° to about 150° C. Likewise, the reaction pressures can be varied widely from about atmospheric pressure to very high pressures of the order of 20,000 p.s.i. or higher. A particular economical advantage of the invention is that pressures of the order of about 30 to about 1,000 p.s.i. give excellent results, and it is not necessary to employ extremely high pressures. The pressure employed is usually only sufficient to maintain the reaction mixture in liquid form during the polymerization, although higher pressures can be used. The pressure is ordinarily achieved by pressuring the system with the monomer whereby additional monomer dissolves in the reaction vehicle as the polymerization progresses. The liquid vehicle employed is desirably one which serves as an inert liquid reaction medium.

The invention is of particular importance in the preparation of highly crystalline polypropylene, although the invention can be used to polymerize butene-1, pentene-1 and other α-olefinic hydrocarbons, particularly α-monoolefins containing up to 10 carbon atoms. The process of the invention readily results in solid polymers having molecular weights greater than 1000 and usually greater than 10,000. The process is quite useful for polymerizing propylene to form a crystalline high density polymer having a softening point above 155° C. and a density of at least 0.90. Usually the density of the polypropylene is of the order of 0.91 to 0.92.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight fractions which are ordinarily found in polymers prepared by batch reactions.

In the continuous flowing stream process, the temperature is desirably maintained at a substantially constant value within the preferred range in order to achieve the higher degree of uniformity. Since it is desirable to employ a solution of the monomer of relatively high concentration, the process is desirable effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight, based on the weight of the vehicle. The concentration of the monomer in the vehicle will vary rather widely depending upon the reaction conditions and will usually range from about 2 to about 50% by weight. For a solution type of process it is preferred to use a concentration from about 2 to about 10% by weight, based on the weight of the vehicle, and for a slurry type of process, higher concentrations, for example, up to 40% and higher, are preferred. Higher concentrations of monomer ordinarily increase the rate of polymerization but concentrations above 5–10% by weight in a solution process are ordinarily less desirable because the polymer dissolved in the reaction medium results in a very viscous solution.

The preferred molar ratio of organo-aluminum halide to transition metal compound in the catalyst is generally in the range of about 1:0.5 to about 1:2. The mole ratio of organo-aluminum halide to ethylenically unsaturated hydrocarbon is generally in the range of about 10:1 to about 1:5 but it will be understood that higher and lower mole ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed, if any, can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentene, n-octane, isooctane, methyl cyclohexane, and any of the other well known inert liquid hydrocarbons. The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent, the catalyst can be contacted advantageously with polymerizable α-monoolefin.

the ring, phenyl substituted acyclic straight chain hydrocarbons containing at least three ethylenic bonds and polybutadiene having an inherent viscosity in tetralin at 145° C. in the range of about .1 to about 1.5, the molar ratio of component (1) to component (3) being in the range of about 10:1 to about 1:5.

2. In the polymerization of propylene to solid, crystalline polymer, the improvement which compromises catalyzing the polymerization with a catalytic mixture consisting essentially of (1) organo-aluminum halides having a formula selected from the group consisting of $R_mAlX_n$ and $R_3Al_2X_3$ where R is a member selected from the group consisting of alkyl, cycloalkyl, phenyl, tolyl, X is a halogen selected from the group consisting of chlorine and bromine and $m$ and $n$ are integers whose sum is equal to the valence of aluminum, (2) a compound selected from the group consisting of halides, alkoxy halides and alkoxides of a transition metal from Group IVB–VIB of the Periodic Table and (3) a member selected from the group consisting of monocyclic hydrocarbons containing up to 16 carbon atoms and at least three ethylenic bonds in the ring, phenyl substituted acyclic straight chain hydrocarbons containing at least three ethylenic bonds and polybutadiene having an inherent viscosity in tetralin at 145° C. in the range of about .1 to about 1.5, the molar ratio of component (1) to component (3) being in the range of about 10:1 to about 1:5.

3. The process which comprises polymerizing propylene to solid high molecular weight polymer in the presence of a catalyst consisting essentially of ethyl aluminum dichloride, titanium trichloride and cyclododecatriene.

4. The process which comprises polymerizing propylene to solid high molecular weight polymer in the presence of a catalyst consisting essentially of ethyl aluminum sesquichloride, titanium trichloride and cyclododecatriene.

5. The process which comprises polymerizing propylene to solid high molecular weight polymer in the presence of a catalyst consisting essentially of ethyl aluminum dichloride, titanium trichloride and 1,2-polybutadiene having an inherent viscosity in tetralin at 145° C. of about 0.2.

6. The process which comprises polymerizing propylene to solid high molecular weight polymer in the presence of a catalyst consisting essentially of ethyl aluminum dichloride, titanium trichloride and tetraphenyl-1,2,3-butatriene.

7. The process which comprises polymerizing 3-methyl-1-butene to solid high molecular weight polymer in the presence of a catalyst consisting essentially of ethyl aluminum dichloride, titanium trichloride and cyclododecatriene.

8. As a composition of matter, a catalyst for the polymerization of α-olefinic hydrocarbons to high molecular weight polymer consisting essentially of (1) organo-aluminum halides having a formula selected from the group consisting of $R_mAlX_n$ and $R_2Al_2X_3$ where R is a member selected from the group consisting of alkyl, cycloalkyl, phenyl, tolyl, X is a halogen selected from the group consisting of chlorine nad bromine and $m$ and $n$ are integers whose sum is equal to the valence of aluminum, (2) a compound selected from the group consisting of halides, alkoxy halides and alkoxides of a transition metal from Group IVB–VIB of the Period Table and (3) a member selected from the group consisting of monocyclic hydrocarbons containing up to 16 carbon atoms and at least three ethylenic bonds in the ring, phenyl substituted acyclic straight chain hydrocarbons containing at least three ethylenic bonds and polybutadiene having an inherent viscosity in tetralin at 145° C. in the range of about .1 to about 1.5, the molar ratio of component (1) to component (3) being in the range of about 10:1 to about 1:5.

9. As a composition of matter, a catalyst for the polymerization of α-olefinic hydrocarbons to high molecular weight polymer consisting essentially of ethyl aluminum dichloride, titanium trichloride and cyclododecatriene.

10. As a composition of matter, a catalyst for the polymerization of α-olefinic hydrocarbons to high molecular weight polymer consisting essentially of ethyl aluminum sesquichloride, titanium trichloride and cyclododecatriene.

11. As a composition of matter, a catalyst for the polymerization of α-olefinic hydrocarbons to high molecular weight polymer consisting essentially of ethyl aluminum dichloride, titanium trichloride and 1,2-polybutadiene having an inherent viscosity in tetralin at 145° C. of about 0.2.

12. As a composition of matter, a catalyst for the polymerization of α-olefinic hydrocarbons to high molecular weight polymer consisting essentially of ethyl aluminum dichloride, titanium trichloride and tetraphenyl-1,2,3-butatriene.

13. As a composition of matter, a catalyst for the polymerization of α-olefinic hydrocarbons to high molecular weight polymer consisting essentially of ethyl aluminum dichloride, titanium trichloride and cyclododecatriene.

No references cited.

JOSEPH L. SCHOFER, *Primary Examiner.*

L. EDELMAN, *Assistant Examiner.*

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The invention is illustrated by the following examples of certain preferred embodiments thereof, although it will be understood that the invention is not limited thereby unless otherwise specifically indicated.

Example 1

Into a stainless steel autoclave is weighed 0.45 g. of ethyl aluminum dichloride, 0.55 g. of titanium trichloride and 0.28 g. of cyclododecatriene. The autoclave is charged with 200 ml. of liquid propylene and attached to a rocking mechanism. The temperature is raised to 85° C. and the autoclave is rocked for 4 hours. At the end of this time the autoclave is cooled, vented and opened. 48.6 g. of highly crystalline polypropylene having an inherent viscosity in tetralin at 145° C. of 3.6 is obtained.

Similar results are obtained when the above procedure is repeated using cyclooctatetraene or cycloheptatriene in place of the cyclododecatriene. The products obtained are solid, highly crystalline polymers of propylene and the yields vary from 50 to 80% of the theory.

In another run using the same procedure as described above with a mixture of ethyl aluminum dichloride and titanium trichloride as catalyst, there is obtained no solid polypropylene.

Example 2

A 300 cc. stainless steel autoclave is charged with 0.45 g. of ethyl aluminum dichloride and 0.55 g. of titanium trichloride and 0.5 g. of 1,2-polybutadiene (inherent viscosity in tetralin at 145° C. of 0.2) dissolved in 25 to 50 cc. of benzene. The autoclave is charged with approximately 150 ml. of liquid propylene and heated to 85° C. with rocking for 4 hours. At the completion of the run the autoclave is cooled, vented and opened. There is obtained 55 g. of solid polypropylene.

Similar results are obtained when the 1,2-polybutadiene in the above procedure is replaced with 1,4-polybutadiene having an inherent viscosity in tetralin at 145° C. in the range of 0.1–1.5, tetraphenyl-1,2,3-butatriene or 1,6-diphenyl-1,3,5-hexatriene.

When the above run is repeated without the addition of the unsaturated hydrocarbon to the catalyst mixture there is obtained only a mixture of oils and little or no solid polymer.

Example 3

The procedure of Example 1 is repeated except that ethyl aluminum sesquichloride is used in place of the ethyl aluminum dichloride in the catalyst mixture. The total catalyst employed is 1 g. and the mole ratio of ethyl aluminum sesquichloride to cyclododecatriene to titanium trichloride is 4:1:3. There is obtained 20.5 g. of solid crystalline polypropylene.

The above run is repeated with a catalyst ratio of 2:1:3 to obtain 20.9 g. of crystalline polypropylene. In another run, employing a catalyst ratio of 1:1:3 the yield of solid crystalline polypropylene is 27.9 g.

When the unsaturated hydrocarbon is omitted from the catalyst mixture, i.e., the catalyst ratio is 2:0:3 only trace quantities of solid polymer are obtained and even these trace quantities are predominately amorphous, i.e., soluble in butyl ether.

Example 4

The procedure of Example 1 is repeated with 3-methyl-1-butene as the monomer and a polymerization temperature of 150° C. There is obtained 26 g. of highly crystalline poly-3-methyl-1-butene.

Similar results are obtained when the 3-methyl-1-butene of the above run is replaced with other olefinic unsaturated polymerizable hydrocarbons such as 4-methyl-1-pentene, butene-1, vinylcyclohexane, styrene, and the like.

Example 5

The procedure of Example 1 is repeated with a 2 g. catalyst charge containing ethyl aluminum dichloride, titanium trichloride and cyclododecatriene in a 1:1:1 mole ratio. The yield of solid polypropylene is 43 g.

Similar results are obtained when the titanium trichloride is replaced with vanadium tetrachloride, zirconium tetrachloride, molybdenum pentachloride, chromic chloride, molybdenum trichloride, molybdenum tetrachloride. In each case the product obtained is a solid crystalline polymer.

Example 6

As already indicated, ethylenically unsaturated hydrocarbons which are closely related to those employed as components in the catalyst system described herein, will not be effective catalyst components for the preparation of high molecular weight, crystalline polymers. To illustrate, the procedure of Example 1 is repeated using 0.45 g. of ethyl aluminum dichloride, 0.55 g. titanium tetrachloride and 0.28 g. of 1,3,5-trivinyl cyclohexane. The autoclave is charged with 200 ml. of liquid propylene and attached to a rocking autoclave mechanism. The temperature is raised to 85° C. and the autoclave rocked for 4 hours. At the end of the run the autoclave is cooled, vented and opened. There is obtained a mixture of oils with little or no solid polymer.

Similar results are obtained when the above procedure is repeated with 4-vinylcyclohexane as one component of the catalyst. The product obtained is a mixture of oils with little or no solid polymer.

The polymers prepared in accordance with this invention can be molded and extruded and can be used to form plastic sheets or a variety of molded objects which exhibit excellent stiffness. The product can be extruded in the form of pipes of excellent rigidity and can be injection molded to a wide variety of articles. Fibers of high strength can be spun from the molten polymers, particularly the poly-α-monoolefins obtained according to the process.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. In the polymerization of α-olefinic hydrocarbons containing at least three carbon atoms to solid, crystalline polymer, the improvement which comprises catalyzing the polymerization with a catalytic mixture consisting essentially of (1) organo-aluminum halides having a formula selected from the group consisting of $R_mAlX_n$ and $R_2Al_2X_3$ where R is a member selected from the group consisting of alkyl, cycloalkyl, phenyl, tolyl, X is a halogen selected from the group consisting of chlorine and bromine and $m$ and $n$ are integers whose sum is equal to the valence of aluminum, (2) a compound selected from the group consisting of halides, alkoxy halides and alkoxides of a transition metal from Group IVB–VIB of the Periodic Table and (3) a member selected from the group consisting of monocyclic hydrocarbons containing up to 16 carbon atoms and at least three ethylenic bonds in